Sept. 22, 1936.    P. C. A. M. D'AUBAREDE    2,055,279
VIBRATION ABSORBING SUPPORT
Filed April 15, 1933    2 Sheets-Sheet 1
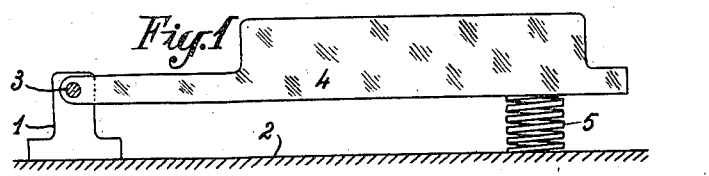
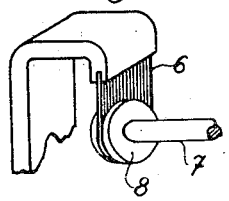
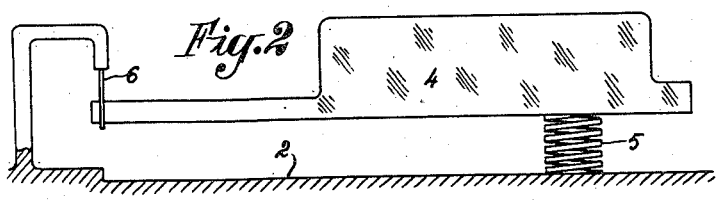
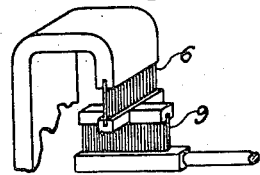
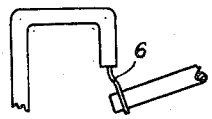
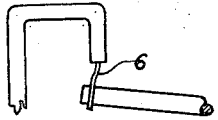
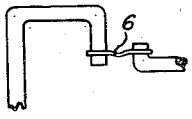
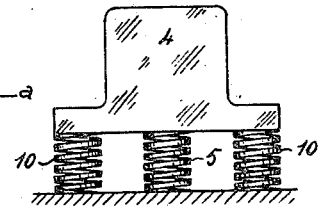
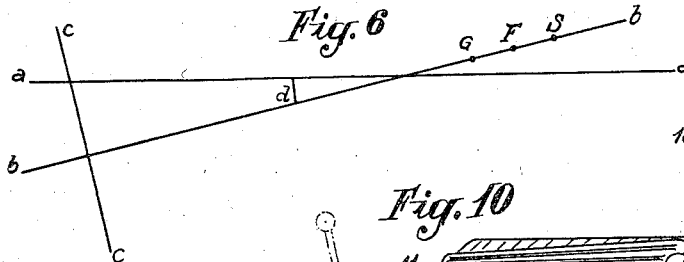
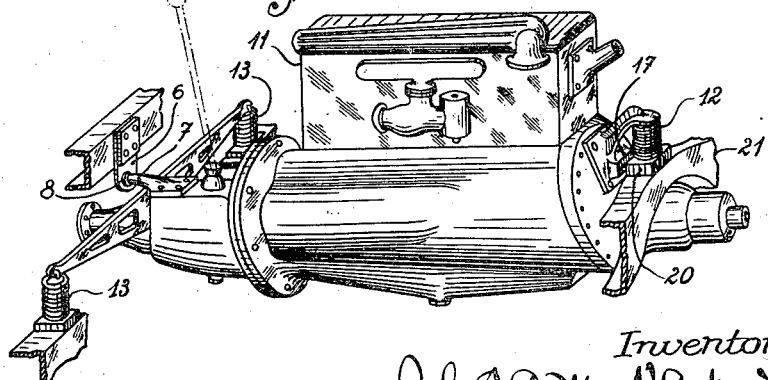
Inventor,
Paul C. A. M. d'Aubarede
by
Attorneys.

Sept. 22, 1936.   P. C. A. M. D'AUBARÈDE   2,055,279
VIBRATION ABSORBING SUPPORT
Filed April 15, 1933   2 Sheets-Sheet 2
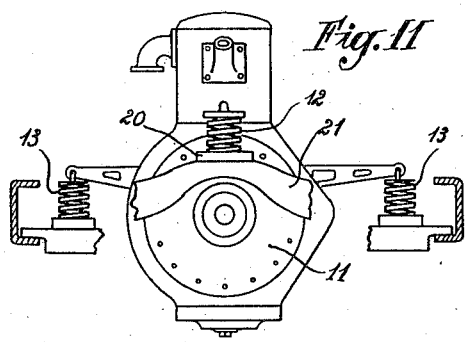
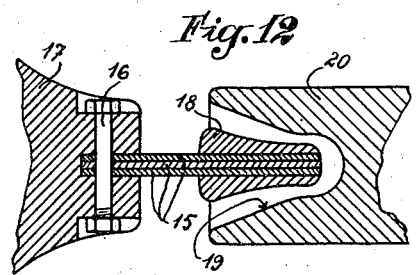
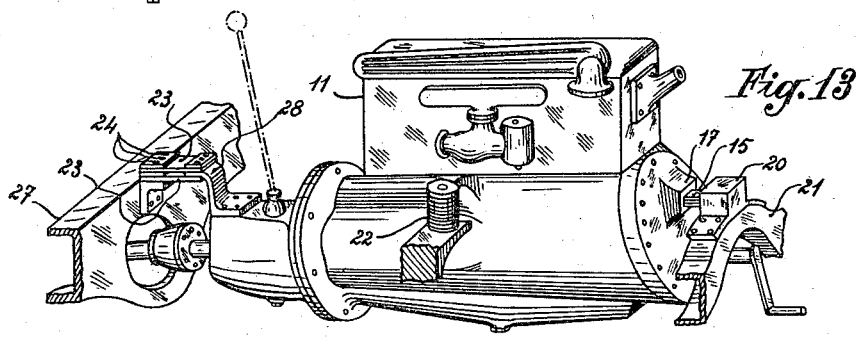
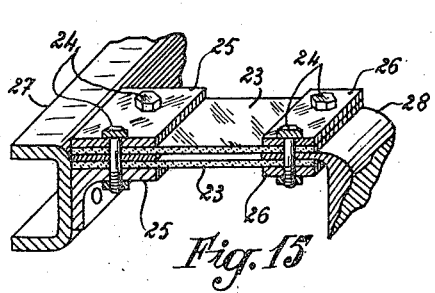
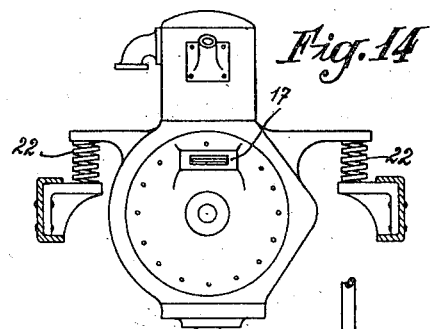
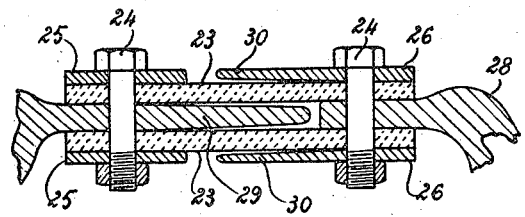
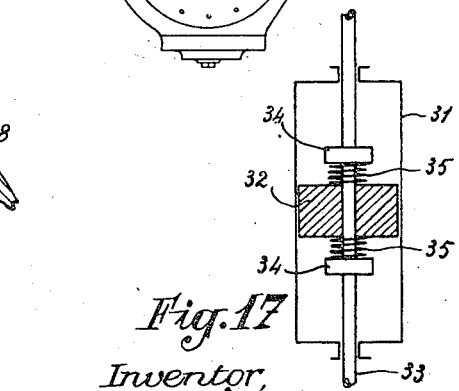
Inventor,
Paul C. A. M. d'Aubarède
by
Attorneys

UNITED STATES PATENT OFFICE 2,055,279

VIBRATION ABSORBING SUPPORT

Paul Charles Albert Marie d'Aubarède,
Saint-Genis Laval, France

Application April 15, 1933, Serial No. 666,380
In France April 16, 1932

15 Claims. (Cl. 248—7)

My invention relates to a process or arrangement for connecting a body with a support with a view to lessen the transmission of periodical strains from the body to the support or, inversely, from the support to the body.

The connection according to my invention results in the body oscillating freely under the action of periodical strains to which it is submitted, without these strains being transmitted to the support or frame.

This body may be a reciprocating machine, for instance, such as an automobile engine. This engine as a whole is submitted to periodical strains (forces and/or torques) which result from the variation in the velocity of the moving parts, from the unavoidable lack of balance and from the variation of the internal pressure within the cylinders. The latter produces periodical torques admitting as geometrical axis the motor axis itself.

My invention has for its object, in such an instance, the connection of the engine (together with its related parts) with a fixed or movable support (such as an automobile frame) in such a way that the periodical strains are substantially not transmitted to the support.

In the annexed drawings:

Fig. 1 is a diagram showing a prior arrangement to make the problem clearer.

Fig. 2 shows an arrangement according to the invention to reduce or suppress the periodical strains resulting from the periodical forces to which the body is submitted.

Figs. 3 and 4 are diagrams adapted to show the variation in longitudinal position of the axis of rotation of the body.

Fig. 5 shows another arrangement according to the invention.

Fig. 6 is a plane view showing in horizontal projection a remarkable plane of a body such as an automobile engine, the center of gravity and the resultant of the periodical forces.

Figs. 7 and 8 diagrammatically show how it is possible to reduce, according to the invention, the strains resulting from periodical torques co-axial with the motor shaft.

Fig. 9 is a diagrammatical front view from the right of Fig. 2, showing the arrangement of elastic means against the rotation of the engine under the action of torques co-axial with the motor shaft.

Fig. 10 shows an automobile engine connected to its supporting frame according to this invention.

Fig. 11 is a front view thereof.

Fig. 12 is a section to an enlarged scale of a detail of Fig. 10, viz. the front limiting abutment.

Fig. 13 shows another embodiment of my invention.

Fig. 14 is a front view of the engine of Fig. 13.

Fig. 15 is a sectional view to an enlarged scale of a detail of Fig. 13, viz. the connecting element.

Fig. 16 is a sectional view of another form of connecting element of the kind shown in Fig. 15.

Fig. 17 diagrammatically shows a limiting damper.

It is well-known that when a body is submitted to a percussion, there exists a geometrical axis, perpendicular to the plane containing the center of gravity and the line of action of the percussion, which axis is of rotation for the body, the action of the percussion resulting into a mere rotation of the body around said axis.

It has been proposed to assimilate the periodical forces to which is submitted a body such as an automobile engine, to a series of percussions and to materialize this axis by means of an arrangement such as a shaft 3 fixed to the body 4 and rotatable in bearings 1 fixed on the support 2. And since this arrangement is not sufficient to support the body against gravity, there was also provided an elastic means of any description, such as a spring 5.

But I have found that the rotation axis is also submitted to the action of forces resulting from the motion of the body itself under the action of the periodical forces to which it is submitted. This causes a variation in the longitudinal position of said axis with respect to the body 4 and also with respect to the support 2.

The position of the rotation axis is also dependent from the frequency of the periodical forces to which the body is submitted. When this frequency is variable (as in the case of an automobile engine) a correct materialization of the same according to the arrangement of Fig. 1 is of course impossible.

According to my invention, by an appropriate choice of the static and dynamic parameters of the body, of the strength and position of the elastic means, the variations of said axis in longitudinal position are limited and the average position is conveniently located.

This axis is then materialized not by means of a shaft rotating in bearings, but through a flexible strip 6 (Fig. 2), a flexible disk or any suitable device permitting said axis to vary in longitudinal position in the manner shown in Figs. 3 and 4.

Fig. 5 shows another arrangement in which the strip 6 is horizontal.

In Fig. 6 the plane of the drawings being supposedly horizontal, $a$—$a$ is the trace on said plane of a remarkable plane of the body (i. e. in a standard automobile engine, the vertical plane of the motor shaft which is generally chosen as a drawing chart); $b$—$b$ is the projection of the plane containing the center of gravity and the resultant of the periodical forces. G is the projection of the center of gravity, F the projection of the resultant of the periodical forces and S the projection of the line of action of the spring means. The rotation axis $c$—$c$ is perpendicular to plane $b$—$b$. It is to be noted that the angle $d$ of planes $a$—$a$ and $b$—$b$ may be easily varied by the arrangement of the parts directly associated with the body (such parts being in the case of an automobile engine, the starter, the electric generator, the water-pump, the lighting apparatus, etc. . .), such an arrangement affecting the position of the center of gravity G. The distance between $c$—$c$ and F may be controlled by varying the position of the center of gravity, the inertia momentum of the body, or the strength and position of spring means. It is thus possible to have the rotation axis $c$—$c$ so arranged in direction and position that it is easily materialized. When it is difficult to control $d$ as required, the flexibility of strip 6 compensates the eventual angular difference between the theorical or experimental axis and the axis as materialized.

When the body 4 is submitted to a periodical force having an amplitude J, the support 2 is submitted, through spring 5, to a periodical force having an amplitude H. The ratio H/J must be as reduced as possible.

This is obtained, according to my invention, by an appropriate determination of spring 5. This spring—or any other elastic means—together with body 4 constitutes an oscillating system, exactly similar to an electric oscillating circuit. This system is devised so as to act as an arresting filter for all the periodicities of periodical forces to which body 4 is submitted. For instance, if body 4 is an automobile engine, the characteristics of the oscillating system 4—5 will be such that it will act as an arresting filter for all the working speeds of the engine.

By the term "arresting filter", I mean that the springs are so computed that the natural frequency of the engine oscillating about its natural connection is lower than $$\frac{1}{\sqrt{2}}$$

times the frequency of the periodical forces and periodical torques at the lowest working speed of the engine, i. e., so that the periodical reaction exerted by the springs on the frame, base, or support is lower than the periodical forces or torques applied to the engine proper within the driving range of operation of the engine, it being well known in mechanics that this condition is fulfilled when $$n < f \frac{1}{\sqrt{2}}$$

where $n$ is the natural frequency of the system (computed when the engine is at a standstill) and $f$ is the frequency of the impressed force.

It is also well-known that the periodical torques resulting from the irregularity of the motor torque have a tendency to rotate the engine around an axis parallel to the motor axis (crankshaft axis) but different from the latter. This rotation axis will be hereinafter termed torque rotation axis to differentiate it from axis $c$—$c$ (Fig. 6) which will be termed force rotation axis.

The body or motor may be arranged rotatable around appropriate axis by means of, for instance, a projection 7 rotatable in a bearing 8 fixed to strip 6.

This torque rotation axis has properties similar to those of the force rotation axis. Its position is dependent from the frequency of the periodical torques and from the rotational motion of the body or motor itself.

The variations of the position of this torque rotation axis may be compensated, according to my invention, by a non-rigid arrangement such as a flexible strip 9 (Fig. 8) substantially perpendicular to strip 6.

It is of course necessary to provide means to maintain the body or motor in position and also to support the average torque (working torque). This is obtained by a second spring system 10 (Fig. 9) arranged so as to cause no reaction on axis 7. Springs 10 (or any other appropriate elastic means) are determined as springs 5, i. e. considering say an automobile engine 4 oscillatable around an axis 7 against springs 10, the characteristics of the oscillating system 4—10 should be such that it will act as an arresting filter for all the working speeds of the engine. These springs 10 must of course be arranged so as not to interfere with the role of spring 5, that is to say, they must be unaffected by the oscillations of body 4 under the action of the periodical forces.

It is sometimes possible to so determine the springs 10—10 (in strength and position) that they also support the engine (body 4), spring 5 then being omitted.

In most cases, the body or motor 4 is also submitted to forces which are not incident to its work proper. In the case of an automobile engine, for instance, the irregularities of the road may cause abnormal forces which tend to move the engine (with respect to the frame) much more than the periodical forces or torques.

This is remedied, according to my invention, and without disturbing the adjustment of the spring systems, by limiting the motion of the engine with respect to the frame by means of abutments or dampers of any description, which must be arranged so as to not interfere with the normal working of the devices above-described, this latter condition being essential. For instance, considering Fig. 2, the abutments or dampers should be arranged so that the characteristics of the oscillating system 4—5 are not disturbed under normal conditions.

Figs. 10 and 11 show an embodiment of my invention applied to an automobile engine.

The engine 11 is attached to the frame by means of a flexible strip 6 of any description, the arrangement being similar to what is disclosed in Fig. 7. The engine is further supported by a front spring 12 which plays the role of spring 5, Fig. 2. Two springs 13 are arranged to resist the average value of the torque. They are substantially in or near the vertical plane of strip 6 so as to be unaffected by the oscillations of the engine under the action of the periodical forces. They do not thus interfere with the role of spring 12.

The limiting abutment is detailed in Fig. 12. It comprises a stack of spring leaves 15 secured by means of bolts such as 16 to a member 17.

The free end of the stack is provided with a covering 18 of rubber or any other soft material, and it is located with considerable play, in a housing 19 of a second member 20. The latter is secured to a transverse beam 21 of the frame (Figs. 10 and 11), member 17 being secured to the engine 11 itself.

The latter is thus free to oscillate up to a given amount. This is sufficient under normal conditions. But under abnormal conditions any tendency of the engine to move more than normal with respect to the frame, is radically prevented.

In Figs. 13 and 14, the connecting element between engine and frame is arranged horizontally as diagrammatically shown in Fig. 5. There is provided but one pair of springs which are adapted to equilibrate the average torque and also to support the engine. They are of course disposed far from the plane of the force rotation axis. The limiting abutment at the front of the engine is of the kind shown in Fig. 12. The front beam 21 is supposedly removed in Fig. 14.

The connecting element is detailed in Fig. 15. It comprises two spaced flexible strips 23 of fabric, leather or the like, clamped at both ends, by means of bolts 24, between jaws 25 and 26, the former being secured to a transverse frame beam 27, and the latter to a member 28 bolted to the gear-box forming part of the engine assembly as shown.

Fig. 16 shows in section a similar form of connecting element comprising also two horizontal strips 23, but wherein there is provided a plate 29 inserted between the strips, and two wings 30 on jaws 26. Plate 29 and wings 30 being more or less triangular in longitudinal section, the element is freely flexible within suitable limits. But in case of shocks, the deformation of the connecting element is limited.

In lieu of limiting abutments of the kind shown in Fig. 12, there may be provided any equivalent means, for example damping means arranged to be normally inactive. Fig. 17 diagrammatically shows an oil cylinder 31 with a piston 32 free on a rod 33. The latter has two stops 34, one of each side of piston 32, and light springs 35 are inserted between stops 34 and piston 32 as shown. An appropriate play has been left between piston 32 and the cylinder walls. When rod 33 is reciprocated with a limited amplitude, it moves freely, without driving piston 32. But when there occurs an abnormal elongation, a stop 34 is brought into contact with piston 32 and pushes the same in cylinder 31, which insures a powerful damping action. In the case of Figs. 13 and 14, such a damper may be associated with each spring 22, the front limiting abutment then being dispensed with.

It is understood that the term "internal" as applied to the inertia forces or torques means that such forces or torques result from the motion of parts internal with respect to the engine and not that their action on the same is different from that of an external force or torque.

I claim:

1. In combination, a frame; an engine subjected to periodical internal forces and to periodical internal torques tending to oscillate the engine about varying natural oscillation axes; spring means supporting said engine on said frame and resiliently opposing natural torque oscillation of said engine on said frame; and a flexible connection between said engine and frame disposed adjacent the average position of the intersection of the varying natural oscillation axes which are the resultants of the actions of said periodical internal forces, periodical internal torques, and spring means, so as to accommodate oscillating movements of the engine about said varying natural axes within the limits of normal operation.

2. In a combination as set forth in claim 1, said flexible connection comprising flexible strips having their ends respectively secured to the engine and frame.

3. In a combination as set forth in claim 1, said flexible connection comprising spaced flexible strips having their ends respectively connected with the engine and frame; a plate carried by one element disposed between the strips; and a pair of plates carried by the other element disposed above and below the pair of flexible strips; said plates limiting the flexing of the strips.

4. In combination, a frame; an engine subjected to periodical internal forces and to periodical internal torques tending to oscillate the engine about varying natural oscillation axes; spring means supporting said engine on said frame and resiliently opposing natural torque oscillation of said engine on said frame; a flexible connection between said engine and frame disposed adjacent the average position of the intersection of the varying natural oscillation axes which are the resultants of the actions of said periodical internal forces, periodical internal torques, and spring means, so as to accommodate oscillating movements of the engine about said varying natural axes within the limits of normal operation and means for limiting the motion of the engine.

5. In combination, a frame; an engine subjected to periodical internal forces and to periodical internal torques tending to oscillate the engine about varying natural oscillation axes; spring means supporting said engine on said frame; additional spring means resiliently opposing natural torque oscillation of said engine on said frame; and a flexible connection between said engine and frame disposed adjacent the average position of the intersection of the varying natural oscillation axes which are the resultants of the actions of said periodical internal forces, periodical internal torques, and the supporting and opposing spring means, as to accommodate oscillating movements of the engine about said varying natural axes within the limits of normal operation.

6. In a combination as set forth in claim 5, means for limiting the motion of the engine with respect to the frame, said means being inoperative under normal operating conditions against oscillations resulting from the actions of the periodical internal forces, periodical internal torques, and spring means.

7. In combination, a frame; an engine subjected to periodical internal forces and to periodical internal torques tending to oscillate the engine about varying natural oscillation axes; a flexible connection between said engine and frame disposed adjacent the average position of the intersection of the varying natural oscillation axes which are the resultants of the actions of said periodical internal forces and periodical internal torques so as to accommodate orbital movement induced by variations from the average natural oscillation axes of the engine; and spring means supporting the engine on said frame and resiliently opposing natural torque oscillations of said engine, said spring means being constructed and arranged to provide an arresting filter for all the frequencies of the periodical forces and periodical torques within the normal working range of the engine.

8. In a combination as set forth in claim 7, means for limiting the motion of the engine with respect to the frame, said means being inoperative under normal operating conditions against oscillations resulting from the actions of the periodical internal forces, periodical internal torques, and spring means.

9. In a combination as set forth in claim 7, means for limiting the motion of the engine with respect to the frame comprising a member extending from the end of the engine opposite to the flexible connection and entering a recess in the frame, said member being normally spaced from the walls of said recess.

10. In combination, a frame, an engine mounted for vibration in the frame, and means for limiting the motion of the engine with respect to the frame, comprising a cylinder filled with a dampening fluid; a rod on the engine entering said cylinder; a piston loose on said rod, said piston forming a permeable partition within said cylinder; abutments on said rod at each side of said piston; and springs interposed between said abutments and piston.

11. In combination, a frame, an engine mounted for vibration in the frame, and spaced flexible strips having their ends respectively connected with the engine and frame; a plate carried by one element disposed between the pair of strips, and a pair of plates carried by the other element disposed above and below the pair of strips, said plates limiting the flexing of the strips.

12. In combination, a frame; an engine subjected to periodical internal forces and to periodical internal torques tending to oscillate the engine about varying natural oscillation axes; spring means supporting said engine on said frame and resiliently opposing natural torque oscillation of said engine on said frame; a flexible connection between said engine and frame disposed adjacent the average position of the intersection of the varying natural oscillation axes which are the resultants of the actions of said periodical internal forces, periodical internal torques, and spring means so as to accommodate oscillating movements of the engine about said varying natural axes within the limits of normal operation; and a limiting abutment located adjacent the average natural oscillation axis of the engine under the action of the periodical torques at the end of said engine opposite to the flexible connection.

13. In combination, a frame; an engine subjected to periodical internal forces and to periodical internal torques tending to oscillate the engine about varying natural oscillation axes; two spring systems disposed on each side of said engine in the vicinity of the middle part thereof to support said engine on said frame and to resiliently oppose natural torque oscillation of said engine on said frame; and a horizontal flexible strip connection disposed adjacent the position of the intersection of said varying natural oscillation axes which are the resultants of the actions of said periodical internal forces, periodical internal torques, and spring means, so as to accommodate oscillating movements of the engine about said varying natural axes within the limits of normal operation.

14. In a combination as set forth in claim 13, said flexible connection comprising spaced flexible strips having their ends respectively connected with the engine and frame; a plate carried by one element disposed between the strips; and a pair of plates carried by the other element disposed above and below the pair of flexible strips; said plates limiting the flexing of the strips.

15. In a combination as set forth in claim 13, a limiting abutment located adjacent the average oscillation axis of said engine under the action of the periodical torques at the end of the engine opposite to said flexible connection.

PAUL CHARLES ALBERT
MARIE D'AUBARÈDE.